US011396135B2

(12) United States Patent
Mamrak et al.

(10) Patent No.: US 11,396,135 B2
(45) Date of Patent: Jul. 26, 2022

(54) POWDER RECLAMATION AND CLEANING SYSTEM FOR AN ADDITIVE MANUFACTURING MACHINE

(71) Applicant: General Electric Company, Schenectady, NY (US)

(72) Inventors: Justin Mamrak, Loveland, OH (US); MacKenzie Ryan Redding, Mason, OH (US); Jordan Maxine Shoemaker, Cincinnati, OH (US); Michael Thomas Gansler, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/761,754

(22) PCT Filed: Nov. 6, 2018

(86) PCT No.: PCT/US2018/059381
§ 371 (c)(1),
(2) Date: May 5, 2020

(87) PCT Pub. No.: WO2019/094367
PCT Pub. Date: May 16, 2019

(65) Prior Publication Data
US 2020/0254691 A1 Aug. 13, 2020

Related U.S. Application Data

(60) Provisional application No. 62/584,145, filed on Nov. 10, 2017.

(51) Int. Cl.
*B29C 64/357* (2017.01)
*B33Y 30/00* (2015.01)
(Continued)

(52) U.S. Cl.
CPC ............ *B29C 64/357* (2017.08); *B22F 10/20* (2021.01); *B29C 64/165* (2017.08); *B29C 64/35* (2017.08); *B33Y 30/00* (2014.12)

(58) Field of Classification Search
CPC ..... B29C 64/357; B29C 64/35; B29C 64/165; B29C 64/153; B22F 10/00; B22F 2999/00;
(Continued)

(56) References Cited

U.S. PATENT DOCUMENTS

| 5,531,253 A | 7/1996 | Nishiyama et al. |
| 6,348,687 B1 | 2/2002 | Brockmann et al. |

(Continued)

FOREIGN PATENT DOCUMENTS

| CN | 105618757 A | 6/2016 |
| CN | 106424728 A | 2/2017 |

(Continued)

OTHER PUBLICATIONS

PCT International Search Report Corresponding to PCT/US2018/059381 dated Mar. 19, 2019.

*Primary Examiner* — Nahida Sultana
(74) *Attorney, Agent, or Firm* — Dority & Manning, P.A.

(57) ABSTRACT

An additive manufacturing machine (910) includes a build unit (920) comprising a powder dispenser (906) including a hopper (1004) for receiving a volume of additive powder (1006). A powder supply system (1000) includes a powder supply source (1010) for providing additive powder (1006) into the hopper (1004) during a refill process. A powder reclamation system (1002) includes a vacuum pump (1030) coupled to a vacuum duct (1034, 1036) defining a suction inlet (1040) positioned for collecting misdirected additive powder (1006) dispensed during the refill process. A return duct (1038) includes a filter mechanism (1050) may filter
(Continued)

and return the collected additive powder (1006) back to the powder supply source (1010) for reuse.

20 Claims, 10 Drawing Sheets

(51) Int. Cl.
  *B29C 64/35*   (2017.01)
  *B29C 64/165*   (2017.01)
  *B22F 10/20*   (2021.01)

(58) Field of Classification Search
  CPC ......... B33Y 30/00; B33Y 10/00; B33Y 40/00;
       Y02P 10/25; Y02P 10/20; B08B 5/04
  See application file for complete search history.

(56) References Cited

U.S. PATENT DOCUMENTS

| | | | |
|---|---|---|---|
| 7,020,539 | B1 | 3/2006 | Kovacevic et al. |
| 7,045,738 | B1 | 5/2006 | Kovacevic et al. |
| 7,828,022 | B2 | 11/2010 | Davidson et al. |
| 8,545,209 | B2 * | 10/2013 | Shi ........................ B33Y 40/00 425/375 |
| 9,376,272 | B2 | 6/2016 | Sato et al. |
| 2002/0090410 | A1 * | 7/2002 | Tochimoto ............ B29C 64/321 425/215 |
| 2013/0101746 | A1 | 4/2013 | Keremes et al. |
| 2014/0348969 | A1 | 11/2014 | Scott |
| 2014/0356078 | A1 | 12/2014 | Stanowski et al. |
| 2016/0318253 | A1 * | 11/2016 | Barnhart ............ B23K 15/0086 |
| 2016/0368224 | A1 | 12/2016 | Ooba et al. |
| 2017/0120536 | A1 | 5/2017 | Brunermer et al. |
| 2017/0144224 | A1 | 5/2017 | DeMuth et al. |
| 2017/0185070 | A1 | 6/2017 | Kronenberg et al. |
| 2018/0021855 | A1 * | 1/2018 | De Lajudie ............. B22F 10/73 419/26 |
| 2018/0133968 | A1 | 5/2018 | Zeulner |
| 2019/0001413 | A1 * | 1/2019 | Golz ....................... B22F 10/70 |
| 2020/0262147 | A1 * | 8/2020 | Mamrak ................ B33Y 50/02 |
| 2020/0324340 | A1 * | 10/2020 | Redding ................ B33Y 40/00 |
| 2021/0206097 | A1 * | 7/2021 | Schalk .................. B33Y 30/00 |

FOREIGN PATENT DOCUMENTS

| | | |
|---|---|---|
| EP | 2583774 A2 | 4/2013 |
| EP | 3321070 A1 | 5/2018 |
| JP | 2017001381 A | 1/2017 |
| WO | WO2010/007396 A1 | 1/2010 |

* cited by examiner

POWDER RECLAMATION AND CLEANING SYSTEM FOR AN ADDITIVE MANUFACTURING MACHINE

PRIORITY INFORMATION

The present applicant claims priority to U.S. Provisional Patent Application Ser. No. 62/584,145 titled "Powder Reclamation and Cleaning System for an Additive Manufacturing Machine" filed on Nov. 10, 2017, the disclosure of which is incorporated by reference herein.

FIELD

The present disclosure generally relates to methods and systems adapted to perform additive manufacturing (AM) processes, for example by direct melt laser manufacturing (DMLM), on a larger scale format.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

Certain conventional AM machines include a build unit that is supported by an overhead gantry. The gantry defines a build area and facilitates movement of the build unit within the build area to repeatedly deposit layers of powder and fuse portions of each layer to build one or more components. The build unit may further include a powder dispenser which includes a powder reservoir or hopper. The hopper is filled with additive powder which is dispensed layer-by-layer during the AM process. Throughout a typical AM process, the hopper of the powder dispenser must be refilled many times.

Notably, the refill process may frequently generate misdirected powder or spillage which can result in operational issues with the machine, imperfections in the finished components, and increased material costs. For example, a refill process typically includes a conveyor that transports additive powder from a reservoir to the hopper where the powder falls off of the conveyor and into the hopper. However, additive powder frequently misses the powder hopper or the hopper may be accidentally overfilled such that additive powder spills over the sides of the hopper. In addition, the collection of falling powder from the conveyor into the hopper may generate a cloud or plume of additive powder which settles throughout the additive manufacturing machine.

Accordingly, an AM machine with an improved powder refilling system would be useful. More particularly, a powder refill, reclamation, and cleaning system that reduces the loss of powder during a refill operation and maintains a clean operating environment would be particularly beneficial.

BRIEF DESCRIPTION

Aspects and advantages will be set forth in part in the following description, or may be obvious from the description, or may be learned through practice of the invention.

According to an exemplary embodiment of the present subject matter, an additive manufacturing machine defining a vertical direction is provided. The additive manufacturing machine includes a build unit including a powder dispenser including a hopper for receiving a volume of additive powder. A powder supply system includes a powder supply source for providing additive powder into the hopper during a refill process. A powder reclamation system includes a vacuum pump for generating a vacuum and a vacuum duct extending from the vacuum pump to a suction inlet, the suction inlet being positioned for collecting misdirected additive powder dispensed during the refill process.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
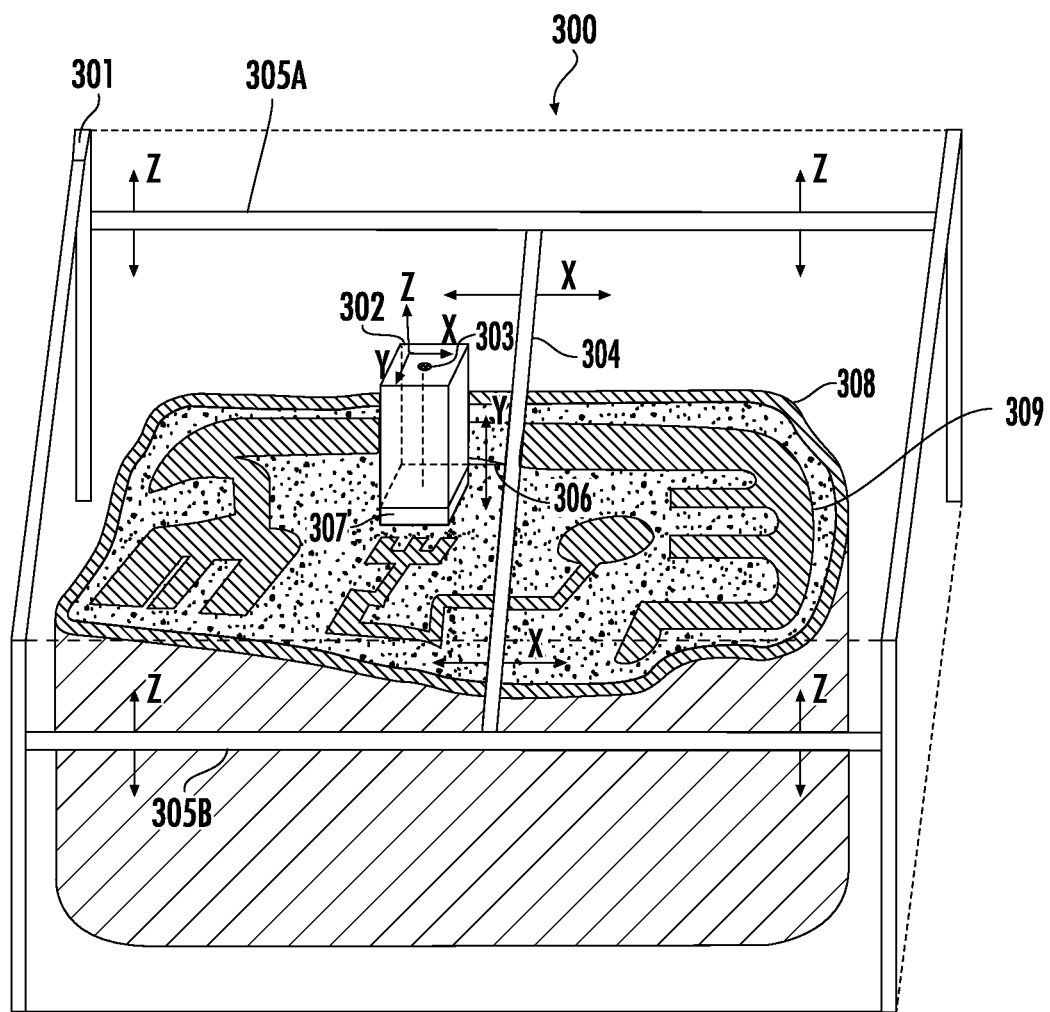
FIG. 1 shows a large scale additive manufacturing apparatus according to an embodiment of the invention.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, the terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

An additive manufacturing machine is generally provided which includes a build unit comprising a powder dispenser including a hopper for receiving a volume of additive powder. A powder supply system includes a powder supply source for providing additive powder into the hopper during a refill process. A powder reclamation system includes a vacuum pump coupled to a vacuum duct defining a suction inlet positioned for collecting misdirected additive powder dispensed during the refill process. A return duct including a filter mechanism may filter and return the collected additive powder back to the powder supply source for reuse.

FIG. 1 shows an example of one embodiment of a large-scale additive manufacturing apparatus 300 according to the present invention. The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The gantry 301 has an x crossbeam 304 that moves the build unit 302 in the x direction. There are two z crossbeams 305A and 305B that move the build unit 302 and the x crossbeam 304 in the z direction. The x cross beam 304 and the build unit 302 are attached by a mechanism 306 that moves the build unit 302 in the y direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser beam irradiation is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. According to an exemplary embodiment, irradiation emission directing device uses an optical control unit for directing the laser beam. An optical control unit may comprise, for example, optical lenses, deflectors, mirrors, and/or beam splitters. Advantageously, a telecentric lens may be used. When a large-scale additive manufacturing apparatus according to an embodiment of the present invention is in operation, if the irradiation emission directing devices directs a laser beam, then generally it is advantageous to include a gasflow device providing substantially laminar gas flow to a gasflow zone as illustrated in FIG. 1, 307 and FIG. 2, 404.

When the irradiation source is an electron source, then the electron source originates the electrons that comprise the e-beam that is directed by the irradiation emission directing device. An e-beam is a well-known source of irradiation. When the source is an electron source, then it is important to maintain sufficient vacuum in the space through which the e-beam passes. Therefore, for an e-beam, there is no gas flow across the gasflow zone (shown, for example at FIG. 1, 307). When the irradiation source is an electron source, then the irradiation emission directing device may be, for example, an electronic control unit which may comprise, for example, deflector coils, focusing coils, or similar elements.

The apparatus 300 allows for a maximum angle of the beam to be a relatively small angle $\theta_2$ to build a large part, because (as illustrated in FIG. 1) the build unit 302 can be moved to a new location to build a new part of the object being formed 309. When the build unit is stationary, the point on the powder that the energy beam touches when $\theta_2$ is 0 defines the center of a circle in the xy plane (the direction of the beam when $\theta_2$ is approximately 0 defines the z direction), and the most distant point from the center of the circle where the energy beam touches the powder defines a point on the outer perimeter of the circle. This circle defines the beam's scan area, which may be smaller than the smallest cross sectional area of the object being formed (in the same plane as the beam's scan area). There is no particular upper limit on the size of the object relative to the beam's scan area.

In some embodiments, the recoater used is a selective recoater. One embodiment is illustrated in FIGS. 2 through 5.

Figure 2:
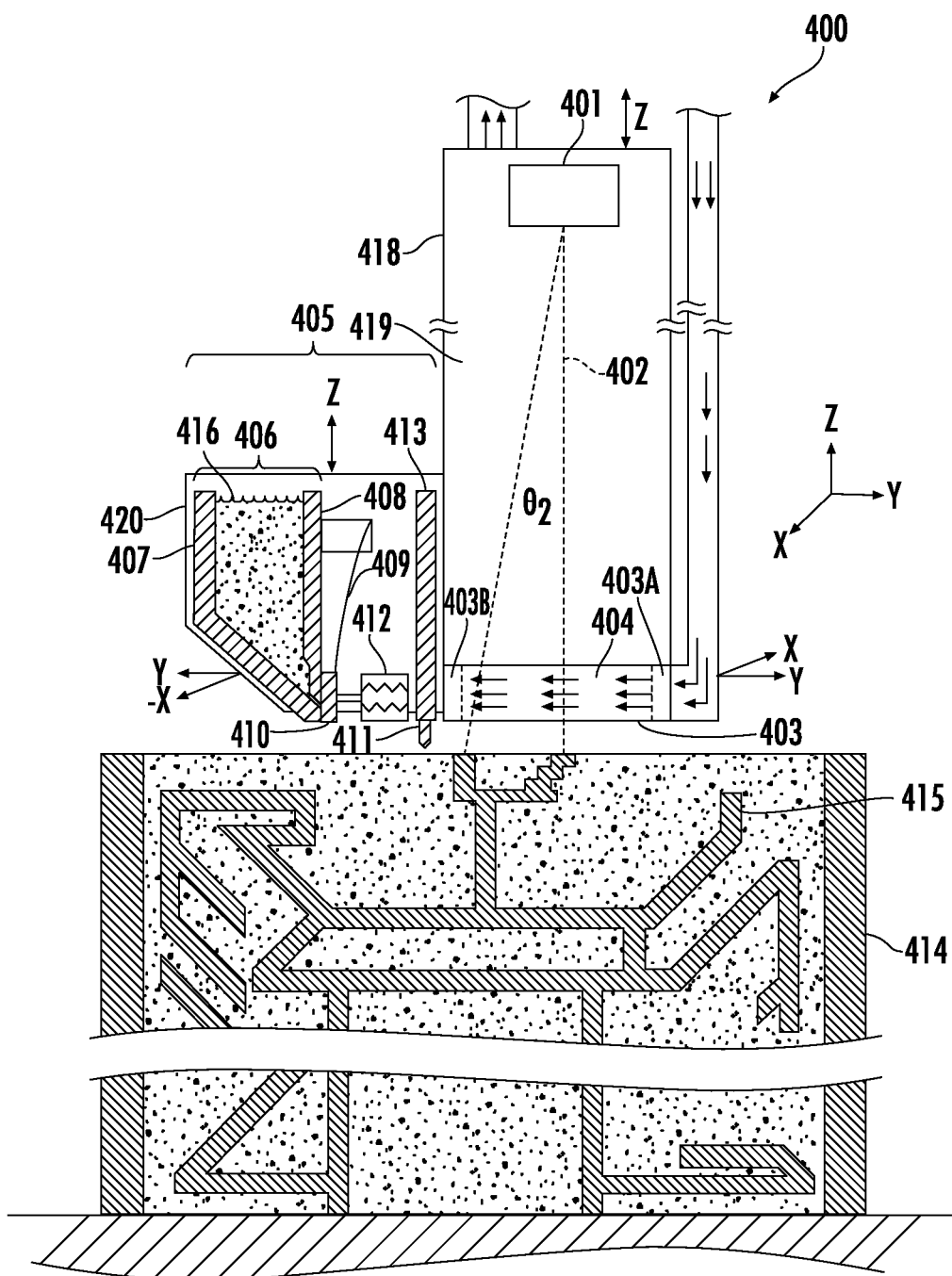
FIG. 2 shows a side view of a build unit according to an embodiment of the invention.

FIG. 2 shows a build unit 400 comprising an irradiation emission directing device 401, a gasflow device 403 with a pressurized outlet portion 403A and a vacuum inlet portion 403B providing gas flow to a gasflow zone 404, and a recoater 405. Above the gasflow zone 404 there is an enclosure 418 containing an inert environment 419. The recoater 405 has a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 2 also shows a build envelope 414 that may be built by, for example, additive manufacturing or Mig/Tig welding, an object being formed 415, and powder 416 contained in the hopper 405 used to form the object 415. In this particular embodiment, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with the powder material, such as cobalt-chrome. In this particular embodiment, the gas flow in the gasflow zone 404 flows in the y direction, but it does not have to. The recoater blade 411 has a width in the x direction. The direction of the irradiation emission beam when $\theta_2$ is approximately 0 defines the z direction in this view. The gas flow in the gasflow zone 404 may be substantially laminar. The irradiation emission directing device 401 may be independently movable by a second positioning system (not shown). FIG. 2 shows the gate plate 410 in the closed position.

Figure 3:
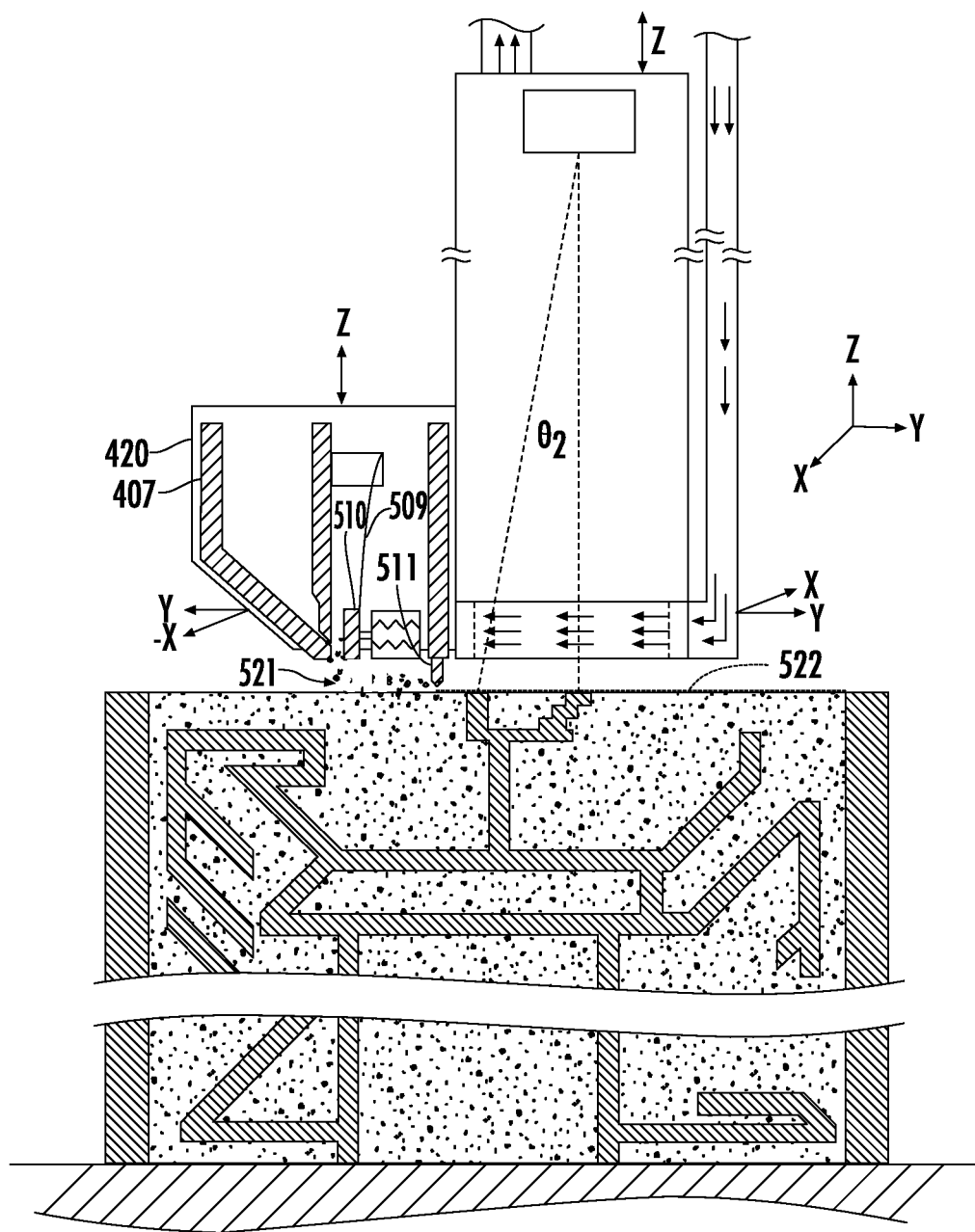
FIG. 3 shows a side view of a build unit dispensing powder according to an embodiment of the invention.

FIG. 3 shows the build unit of FIG. 2, with the gate plate 410 in the open position (as shown by element 510) and actuating element 509. Powder in the hopper is deposited to make fresh powder layer 521, which is smoothed over by the recoater blade 511 to make a substantially even powder layer 522. In some embodiments, the substantially even powder layer may be irradiated at the same time that the build unit is moving, which would allow for continuous operation of the build unit and thus faster production of the object.

Figure 4:
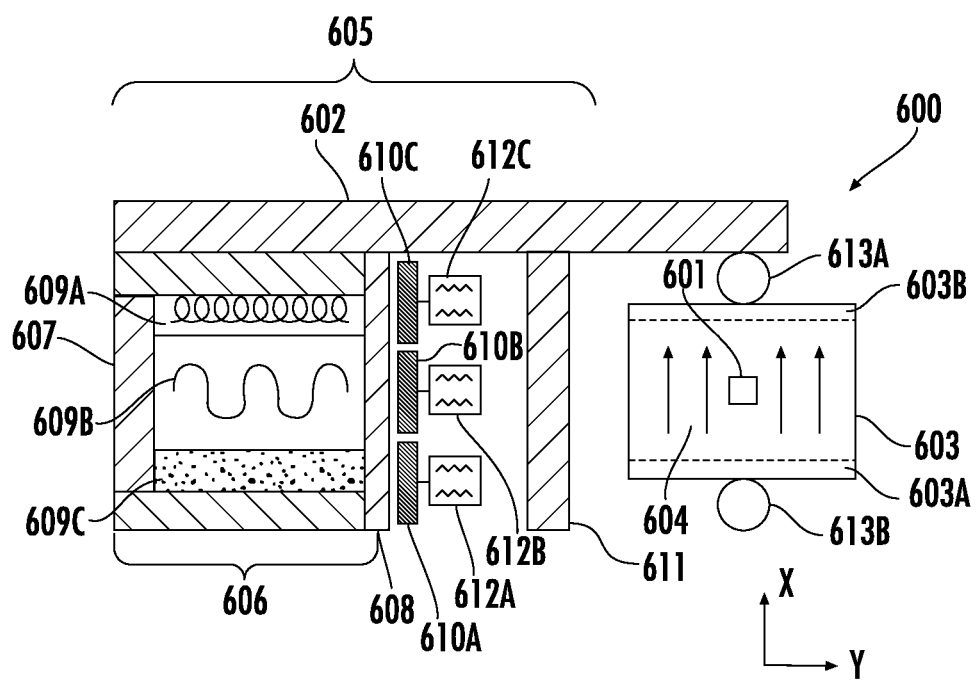
FIG. 4 shows a top view of a build unit according to an embodiment of the invention.

FIG. 4 shows a top down view of the build unit of FIG. 2. For simplicity, the object and the walls are not shown here. The build unit 600 has an irradiation emission directing device 601, an attachment plate 602 attached to the gasflow device 603, hopper 606, and recoater arm 611. The gasflow device has a gas outlet portion 603A and a gas inlet portion 603B. Within the gasflow device 603 there is a gasflow zone 604. The gasflow device 603 provides laminar gas flow within the gasflow zone 604. There is also a recoater 605 with a recoater arm 611, actuating elements 612A, 612B, and 612C, and gate plates 610A, 610B, and 610C. The recoater 605 also has a hopper 606 with a back plate 607 and front plate 608. In this particular illustration of one embodiment of the present invention, the hopper is divided into three separate compartments containing three different materials 609A, 609B, and 609C. There are also gas pipes 613A and 613B that feed gas out of and into the gasflow device 603.

Figure 5:
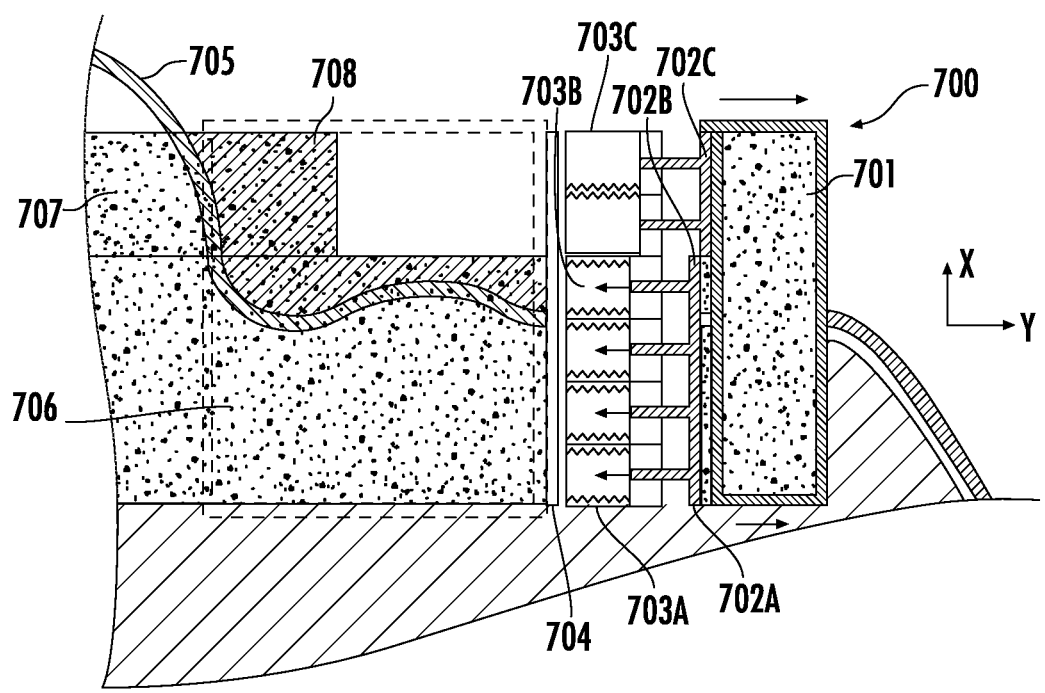
FIG. 5 shows a top view of a recoater according to an embodiment of the present invention.

FIG. 5 shows a top down view of a recoater according to one embodiment, where the recoater has a hopper 700 with only a single compartment containing a powder material 701. There are three gate plates 702A, 702B, and 702C that are controlled by three actuating elements 703A, 703B, and 703C. There is also a recoater arm 704 and a wall 705. When the recoater passes over a region that is within the wall, such as indicated by 707, the corresponding gate plate 702C may be held open to deposit powder in that region 707. When the recoater passes over a region that is outside of the wall, such as the region indicated as 708, the corresponding gate plate 702C is closed by its corresponding actuating element 703C, to avoid depositing powder outside the wall, which could potentially waste the powder. Within the wall 705, the recoater is able to deposit discrete lines of powder, such as indicated by 706. The recoater blade (not shown in this view) smooths out the powder deposited.

Advantageously, a selective recoater according to embodiments of the apparatus and methods described herein allows precise control of powder deposition using powder deposition device (e.g. a hopper) with independently controllable powder gates as illustrated, for example, in FIG. 4, 606, 610A, 610B, and 610C and FIG. 5, 702A, 702B, and 702C. The powder gates are controlled by at least one actuating element which may be, for instance, a bidirectional valve or a spring (as illustrated, for example, in FIG. 2, 409. Each powder gate can be opened and closed for particular periods of time, in particular patterns, to finely control the location and quantity of powder deposition (see, for example, FIG. 4). The hopper may contain dividing walls so that it comprises multiple chambers, each chamber corresponding to a powder gate, and each chamber containing a particular powder material (see, for example, FIG. 4, and 609A, 609B, and 609C). The powder materials in the separate chambers may be the same, or they may be different. Advantageously, each powder gate can be made relatively small so that control over the powder deposition is as fine as possible. Each powder gate has a width that may be, for example, no greater than about 2 inches, or more preferably no greater than about ¼ inch. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates. Advantageously, a simple on/off powder gate mechanism according to one embodiment is simpler and thus less prone to malfunctioning. It also advantageously permits the powder to come into contact with fewer parts, which reduces the possibility of contamination. Advantageously, a recoater according to an embodiment of the present invention can be used to build a much larger object. For example, the largest xy cross sectional area of the recoater may be smaller than the smallest cross sectional area of the object, and there is no particular upper limit on the size of the object relative to the recoater. Likewise, the width of the recoater blade may smaller than the smallest width of the object, and there is no particular upper limit on the width of the object relative to the recoater blade. After the powder is deposited, a recoater blade can be passed over the powder to create a substantially even layer of powder with a particular thickness, for example about 50 microns, or preferably about 30 microns, or still more preferably about 20 microns. Another feature of some embodiments of the present invention is a force feedback loop. There can be a sensor on the selective recoater that detects the force on the recoater blade. During the manufacturing process, if there is a time when the expected force on the blade does not substantially match the detected force, then control over the powder gates may be modified to compensate for the difference. For instance, if a thick layer of powder is to be provided, but the blade experiences a relatively low force, this scenario may indicate that the powder gates are clogged and thus dispensing powder at a lower rate than normal. Under these circumstances, the powder gates can be opened for a longer period of time to deposit sufficient powder. On the other hand, if the blade experiences a relatively high force, but the layer of powder provided is relatively thin, this may indicate that the powder gates are not being closed properly, even when the actuators are supposed to close them. Under these circumstances, it may be advantageous to pause the build cycle so that the system can be diagnosed and repaired, so that the build may be continued without comprising part quality. Another feature of some embodiments of the present invention is a camera for monitoring the powder layer thickness. Based on the powder layer thickness, the powder gates can be controlled to add more or less powder.

In addition, an apparatus according to an embodiment of the present invention may have a controlled low oxygen build environment with two or more gas zones to facilitate a low oxygen environment. The first gas zone is positioned immediately over the work surface. The second gas zone may be positioned above the first gas zone, and may be isolated from the larger build environment by an enclosure. For example, in FIG. 2 element 404 constitutes the first gas zone, element 419 constitutes the second gas zone contained by the enclosure 418, and the environment around the entire apparatus is the controlled low oxygen build environment. In the embodiment illustrated in FIG. 2, the first gasflow zone 404 is essentially the inner volume of the gasflow device 403, i.e. the volume defined by the vertical (xz plane) surfaces of the inlet and outlet portions (403A and 403B), and by extending imaginary surfaces from the respective upper and lower edges of the inlet portion to the upper and lower edges of the outlet portion in the xy plane. When the irradiation emission directing device directs a laser beam, then the gasflow device preferably provides substantially laminar gas flow across the first gas zone. This facilitates removal of the effluent plume caused by laser melting. Accordingly, when a layer of powder is irradiated, smoke, condensates, and other impurities flow into the first gasflow zone, and are transferred away from the powder and the object being formed by the laminar gas flow. The smoke, condensates, and other impurities flow into the low-pressure gas outlet portion and are eventually collected in a filter, such as a HEPA filter. By maintaining laminar flow, the aforementioned smoke, condensates and other impurities can be efficiently removed while also rapidly cooling melt pool(s) created by the laser, without disturbing the powder layer, resulting in higher quality parts with improved metallurgical characteristics. In an aspect, the gas flow in the gasflow volume is at about 3 meters per second. The gas may flow in either the x or y direction.

The oxygen content of the second controlled atmospheric environment is generally approximately equal to the oxygen content of the first controlled atmospheric environment, although it doesn't have to be. The oxygen content of both controlled atmospheric environments is preferably relatively low. For example, it may be 1% or less, or more preferably 0.5% or less, or still more preferably 0.1% or less. The non-oxygen gases may be any suitable gas for the process. For instance, nitrogen obtained by separating ambient air may be a convenient option for some applications. Some applications may use other gases such as helium, neon, or argon. An advantage of the invention is that it is much easier to maintain a low-oxygen environment in the relatively small volume of the first and second controlled atmospheric environments. In prior art systems and methods, the larger environment around the entire apparatus and object must be tightly controlled to have a relatively low oxygen content, for instance 1% or less. This can be time-consuming, expensive, and technically difficult. Thus it is preferable that only relatively smaller volumes require such relatively tight atmospheric control. Therefore, in the present invention, the first and second controlled atmospheric environments may be, for example, 100 times smaller in terms of volume than the build environment. The first gas zone, and likewise the gasflow device, may have a largest xy cross sectional area that is smaller than the smallest cross sectional area of the object. There is no particular upper limit on the size of the object relative to the first gas zone and/or the gasflow device. Advantageously, the irradiation emission beam (illustrated, for example, as 402 and 502) fires through the first and second gas zones, which are relatively low oxygen zones. And when the first gas zone is a laminar gasflow zone with substantially laminar gas flow, the irradiation emission beam is a laser beam with a more clear line of sight to the object, due to the aforementioned efficient removal of smoke, condensates, and other contaminants or impurities.

One advantage of the present invention is that, in some embodiments, the build plate may be vertically stationary (i.e. in the z direction). This permits the build plate to support as much material as necessary, unlike the prior art methods and systems, which require some mechanism to raise and lower the build plate, thus limiting the amount of material that can be used. Accordingly, the apparatus of the present invention is particularly suited for manufacturing an object within a large (e.g., greater than 1 m$^3$) build envelope. For instance, the build envelope may have a smallest xy cross sectional area greater than 500 mm², or preferably greater than 750 mm², or more preferably greater than 1 m². The size of the build envelope is not particularly limited. For instance, it could have a smallest cross sectional area as large as 100 m². Likewise, the formed object may have a largest xy cross sectional area that is no less than about 500 mm², or preferably no less than about 750 mm², or still more preferably no less than about 1 m². There is no particular upper limit on the size of the object. For example, the object's smallest xy cross sectional area may be as large as 100 m². Because the build envelope retains unfused powder about the object, it can be made in a way that minimizes unfused powder (which can potentially be wasted powder) within a particular build, which is particularly advantageous for large builds. When building large objects within a dynamically grown build envelope, it may be advantageous to build the envelope using a different build unit, or even a different build method altogether, than is used for the object. For example, it may be advantageous to have one build unit that directs an e-beam, and another build unit that directs a laser beam. With respect to the build envelope, precision and quality of the envelope may be relatively unimportant, such that rapid build techniques are advantageously used. In general, the build envelope may be built by any suitable means, for instance by Mig or Tig welding, or by laser powder deposition. If the wall is built by additive manufacturing, then a different irradiation emission directing device can be used to build than wall than is used to build the object. This is advantageous because building the wall may be done more quickly with a particular irradiation emission directing device and method, whereas a slower and more accurate directing device and method may be desired to build the object. For example, the wall may be built from a rapidly built using a different material from the object, which may require a different build method. Ways to tune accuracy vs. speed of a build are well known in the art, and are not recited here.

Figure 6:
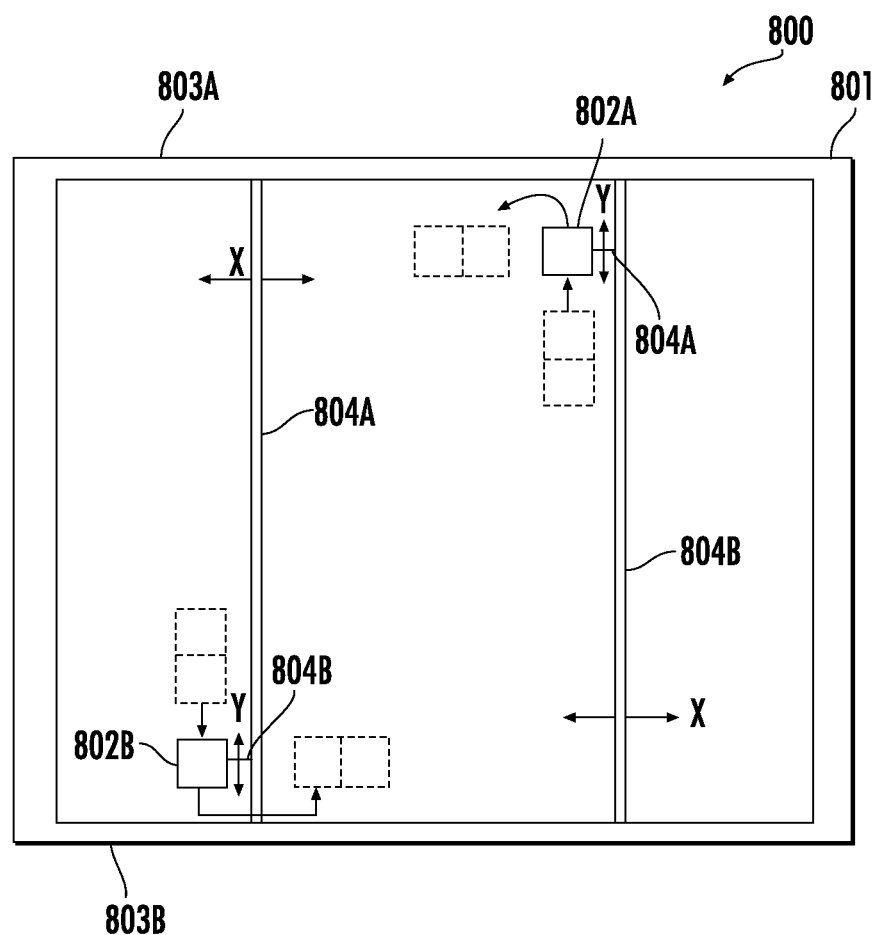
FIG. 6 illustrates a large scale additive manufacturing apparatus with two build units according to an embodiment of the present invention.

For example, as shown in FIG. 6, the systems and methods of the present invention may use two or more build units to build one or more object(s). The number of build units, objects, and their respective sizes are only limited by the physical spatial configuration of the apparatus. FIG. 6 shows a top down view of a large-scale additive manufacturing machine 800 according to an embodiment of the invention. There are two build units 802A and 802B mounted to a positioning system 801. There are z crossbeams 803A and 803B for moving the build units in the z direction. There are x crossbeams 804A and 804B for moving the build units in the x direction. The build units 802A and 802B are attached to the x crossbeams 804A and 804B by mechanisms 805A and 805B that move the units in the y direction. The object(s) being formed are not shown in this view. A build envelope (also not shown in this view) can be built using one or both of the build units, including by laser powder deposition. The build envelope could also be built by, e.g., welding. In general, any number of objects and build envelopes can be built simultaneously using the methods and systems of the present invention.

Figure 7:
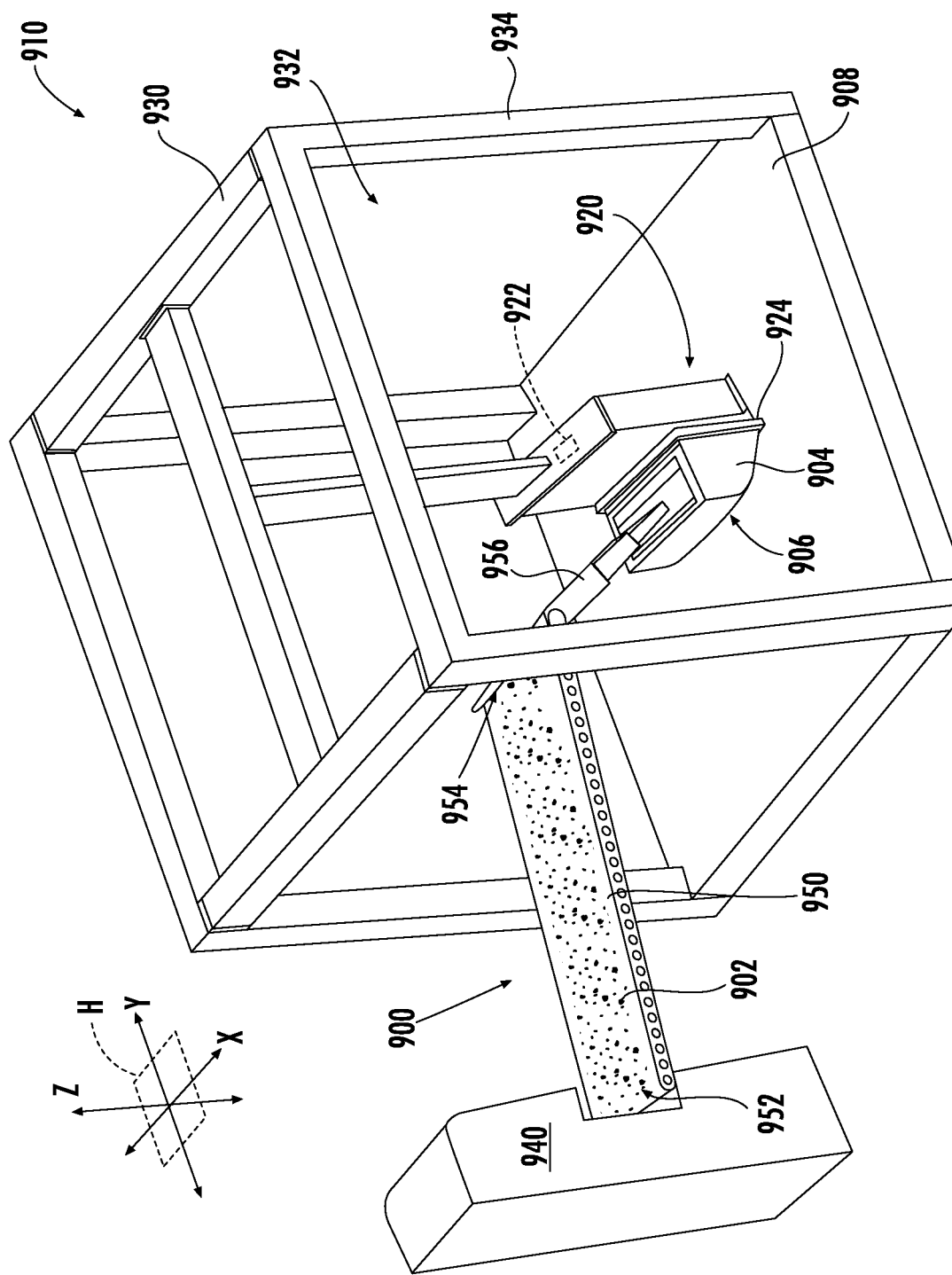
FIG. 7 illustrates a perspective view of a powder supply system according to an embodiment of the present invention.

Referring now to FIG. 7, a powder supply system 900 for providing additive powder 902 to hopper 904 of a powder dispenser 906 will be described according to an exemplary embodiment. As used herein, "additive powder" may be used to refer to any material deposited onto a build plate or build platform 908 of the additive manufacturing machine 910 or on top of a base layer or prior additively formed layer of powder that may be fused or bonded by an energy beam of an energy source such an irradiation emission directing device. The additive powder 902 may be any material suitable for fusing to form a part during the additive manufacturing process. Examples of such material include engineering plastics, thermoplastic elastomers, metals, and ceramics. However, it should be appreciated that other materials could be used according to alternative embodiments.

As illustrated in FIG. 7, additive manufacturing machine 910 defines a vertical direction (i.e., the Z-direction) and a horizontal plane H (e.g., defined by the X-direction and the Y-direction). Build platform 908 extends within the horizontal plane H to provide a surface for depositing layers of additive powder 902, as described herein. In general, additive manufacturing machine 910 includes a build unit 920 that is generally used for depositing a layer of additive powder 902 and fusing portions of the layer of additive powder 902 to form a single layer of a component (not illustrated in FIG. 7). As described above, build unit 920 forms the component layer-by-layer by printing or fusing layers of additive powder 902 as build unit 920 moves up along the vertical direction.

Build unit 920 generally includes a powder dispenser 906 for discharging a layer of additive powder 902 and an energy source 922 for selectively directing energy toward the layer of additive powder 902 to fuse portions of the layer of additive powder 902. For example, powder dispenser 906 may include a powder hopper 904, a system of gates (see, e.g., FIG. 4, 610A-C and FIG. 5, 702A-C), a recoater arm 924, and any other components which facilitate the deposition of smooth layers of additive powder 902 on build platform 908 or a sub layer. In addition, "energy source" may be used to refer to any device or system of devices configured for directing an energy beam towards a layer of additive powder 902 to fuse a portion of that layer of additive powder 902. For example, according to an exemplary embodiment, energy source 922 may be an irradiation emission directing device as described above.

As described above, build unit 920 is described as utilizing a direct metal laser sintering (DMLS) or direct metal laser melting (DMLM) process using an energy source to selectively sinter or melt portions of a layer of powder. However, it should be appreciated that according to alternative embodiments, additive manufacturing machine 910 and build unit 920 may be configured for using a "binder jetting" process of additive manufacturing. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. For example, the liquid binding agent may be a photo-curable polymer or another liquid bonding agent. Other suitable additive manufacturing methods and variants are intended to be within the scope of the present subject matter.

Notably, according aspects of the present subject matter, build unit 920 is supported by a gantry 930 that is positioned above build platform 908 and at least partially defines a build area 932. Notably, as used herein, "gantry" 930 is intended to refer to the horizontally extending support beams and not the vertical support legs 934 that support the gantry 930 over the build platform 908. Although a gantry 930 is used to describe the support for build unit 920 herein, it should be appreciated that any suitable vertical support means can be used according to alternative embodiments. For example, build unit 920 may be attached to a positioning system such as a delta robot, a cable robot, a robot arm, a belt drive, etc. In addition, although build platform 908 is illustrated herein as being stationary, it should be appreciated that build platform 908 may move according to alternative embodiments. In this regard, for example, build platform 908 may be configured for translating along the X-Y-Z directions or may rotate about one of these axes.

According to the illustrated embodiment, gantry 930 defines a build area 932 having a maximum build width (e.g., measured along the X-direction), build depth (e.g., measured along the Y-direction), and build height (measured along the vertical direction or Z-direction). Gantry 930 is generally configured for movably supporting build unit 920 within build area 932, e.g., such that build unit 920 may be positioned at any location (e.g., along X-Y-Z axes) within build area 932. Moreover, according to exemplary embodiments, gantry 930 may further be configured for rotating build unit about the X, Y, and Z axes. Thus, build unit 920 may be positioned and oriented in any suitable manner within build area 932 to perform additive manufacturing process.

Notably, as described briefly above, powder dispenser 906 is capable of holding a limited volume of additive powder 902. Thus, powder hopper 904 must be frequently refilled during the additive manufacturing process so that the powder dispenser 906 may continue to deposit layers of additive powder 902. Powder supply system 900, as described herein, is generally configured for refilling hopper 904 of powder dispenser 906.

In general, as best illustrated in FIG. 7, additive manufacturing machine 910 includes a powder supply source 940 which is positioned external to gantry 930 or outside of build area 932 and is generally configured for continuously supplying additive powder 902 to powder dispenser 906. More specifically, powder supply source 940 is generally sufficient for supplying all additive powder 902 necessary to complete a build process, which may fill the entire build area 932. In this manner, operators of the additive manufacturing machine 910 may make sure that powder supply source 940 always has additive powder 902 ready and available for powder dispenser 906 in the event it needs a refill.

Powder supply system 900 generally includes any suitable number and type of apparatus, devices, or systems of components configured for transporting or conveying additive powder 902 from powder supply source 940 to powder dispenser 906, e.g., directly into powder hopper 904. According to the exemplary embodiment, powder supply system 900 is positioned below gantry 930 along the vertical or Z-direction and extends substantially within the horizontal plane H between powder supply source 940 and powder dispenser 906.

More specifically, according to the illustrated embodiment, powder supply system 900 includes a conveyor 950 that transports additive powder 902 from powder supply source 940 to powder dispenser 906. For example, conveyor 950 may be a simple belt conveyor, bucket conveyor, or any other suitable transport for additive powder 902 to powder dispenser 906. According to still another embodiment, conveyor 950 is a vibrating belt conveyor which may vibrate to facilitate the movement of the additive powder 902. Powder supply system 900 and conveyor 950 may include any suitable features for retaining and transporting additive powder between powder supply source 940 and build unit 920. For example, conveyor 950 may include raised sides which prevent additive powder 902 from falling under the force of gravity. Alternatively, supply system may be a series of buckets or containers that move between powder supply source 940 and hopper 904. According still another embodiment, powder supply system 900 may include a closed tube or conduit that urges additive powder 902 from powder supply source 940 to hopper 904, e.g., under the force of gravity, via a screw drive mechanism, a pump mechanism, or any other suitable means.

Powder supply system 900 can extend from an intake 952 proximate powder supply source 940 to a discharge 954 proximate powder hopper 904. Intake 952 may be any device or apparatus for depositing additive powder 902 onto conveyor 950. Similarly, discharge 954 may be any suitable device or apparatus used to deposit, drop, or otherwise move additive powder 902 from conveyor 950 to powder hopper 904. Thus, for example, powder supply source 940 may be periodically supplied additive powder 902 and may include a vertical drive screw or other mechanism for depositing the additive powder onto intake 952 of conveyor 950. Conveyor 950 may then transport the additive powder 902 from outside of build area 932 into build area 932 in toward build unit 920. Similarly, discharge 954 may include a telescoping chute 956 or some other dispensing mechanism for directing the additive powder 902 from conveyor 950 and into powder hopper 904. According to another embodiment, powder supply source 950 may be manually supplied with additive powder 902, e.g., by an operator of additive manufacturing machine 910. Alternatively, the operator may deposit additive powder 902 directly onto conveyor 950 or into a device which continuously feeds conveyor 950 when hopper 904 needs to be refilled. Conveyor 950 may operate continuously, or when additive powders 902 are detected on conveyor 950, to transport additive powder 902 from powder supply source 940 to build unit 920.

Figure 8:
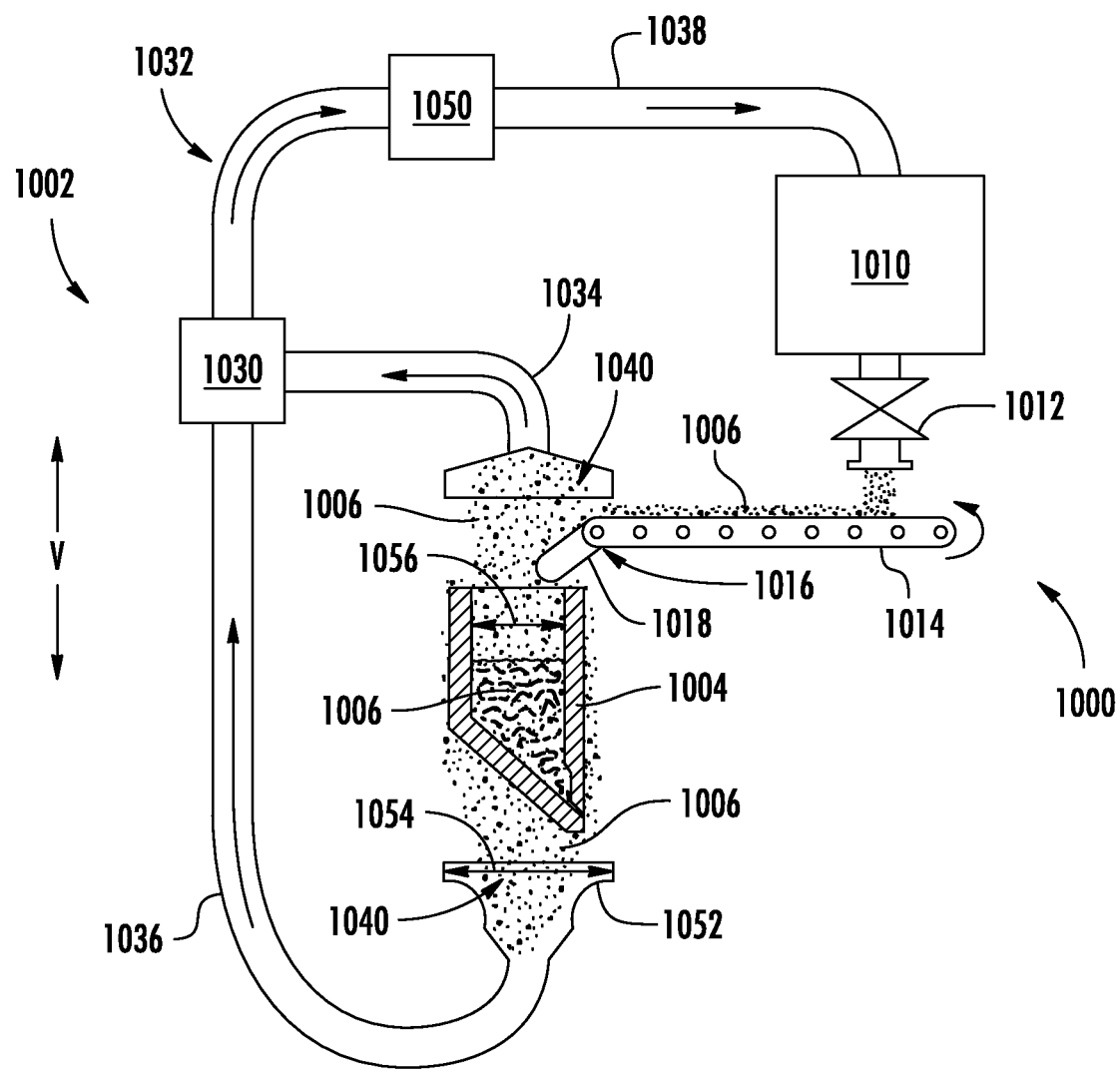
FIG. 8 illustrates a schematic view of a powder supply system and a powder reclamation system according to an embodiment of the present invention.

Referring now to FIG. 8, a powder supply system 1000 and a powder reclamation system 1002 will be described according to an exemplary embodiment of the present subject matter. Powder supply system 1000 and powder reclamation system 1002 may be generally used to the refill a powder dispenser in an additive manufacturing machine. For example, according to the illustrated embodiment, powder supply system 1000 is configured for refilling a hopper 1004, which may be attached to a build unit such as hopper 904 of additive manufacturing machine 910. However, powder supply system 1000 and powder reclamation system 1002 can also be used for supplying additive powder 1006 to any other suitable additive manufacturing machine.

Powder supply system 1000 generally includes a powder supply source 1010, such as a reservoir of additive powder 1006. Powder supply source 1010 is generally configured for providing additive powder 1006 to the hopper of an additive manufacturing machine. For example, as illustrated in FIG. 8, powder supply source 1010 is operably coupled to a dosing valve 1012 for selectively providing a precise amount of additive powder 1006 onto a conveyor 1014. Similar to the embodiment described above with regard to powder supply system 900, conveyor 1014 may be configured for transporting the additive powder 1006 dispensed from the powder supply source 1010 to hopper 1004.

Conveyor 1014 may comprise a discharge 1016 proximate hopper 1004. For example, according to the illustrated embodiment, discharge 1016 is positioned above hopper 1004 along the vertical direction V. In this manner, additive powder 1006 may fall off of the end of conveyor 1014 under the force of gravity into hopper 1004. In addition, discharge 1016 may be any suitable device or apparatus used to deposit, drop, or otherwise move additive powder 1006 from conveyor 1014 to hopper 1004. Thus, for example, discharge 1016 may include a chute 1018 or some other dispensing mechanism for directing the additive powder 1006 from conveyor 1014 and into hopper 1004.

Notably, the refill process of an additive manufacturing machine typically wastes a large amount of additive powder. For example, additive powder 1006 may frequently miss hopper 1004 when exiting discharge 1016 of conveyor 1014, thus falling over the edge of hopper 1004 and down onto a work surface or elsewhere within the additive manufacturing machine. Similarly, inadvertent overfilling of the hopper 1004 can result in spillage of additive powder 1006. Moreover, as additive powder 1006 is deposited into hopper 1004, a plume of additive powder 1006 may be formed which may be deposited throughout the additive manufacturing machine and onto sensitive components. The build-up of additive powder 1006 within components of an additive manufacturing machine may result in serious operational issues. In addition, the misdirected additive powder 1006 is typically not reused, thus resulting in increased material waste and costs. Powder reclamation system 1002, which will be described below according to an exemplary embodiment, is generally configured for collecting additive powder 1006 that is misdirected or inadvertently dispersed during the refill process. In this regard, additive powder 1006 that is dispensed from powder supply source 1010 during the refill process but does not reach hopper 1004 may be referred to herein generally as "misdirected powder."

Although reference numeral 1006 is used herein to identify additive powder in FIG. 8, it should be appreciated that the additive powder 1006 may have different qualities or characteristics at different points within powder supply system 1000. In this regard, for example, additive powder 1006 on conveyer 1014 is typically clean, new, sieved, filtered, etc. Once the additive powder 1006 becomes airborne above hopper 1004 or fails past hopper 1004, i.e., misdirected powder, it is possible that this additive powder 1006 contains debris and/or contamination from elsewhere within powder distribution system 1000 or the surrounding environment. Thus, this misdirected additive powder 1006 may be cleaned or filtered, as described below.

Referring still to FIG. 8, powder reclamation system 1002 generally includes a vacuum pump 1030 that is operably coupled to a duct system 1032 for collecting misdirected additive powder 1006. Vacuum pump 1030 may be any suitable type of pump configured for urging a flow of air, gas, and/or additive powder 1006 through duct system 1032 during a reclamation process where misdirected powders are collected. For example, vacuum pump 1030 may be a fan, a blower, or any other suitable type of compressive pump which generates a negative pressure within duct system 1032 for drawing in additive powder 1006.

As illustrated, duct system 1032 includes an upper intake duct 1034, a lower intake duct 1036, and a return duct 1038. In general upper intake duct 1034 and lower intake duct 1036 may each define a suction inlet 1040 positioned for drawing in a flow of additive powder 1006 and passing it toward vacuum pump 1030. Vacuum pump 1030 merges the flow from intake ducts 1034, 1036 and returns it to powder supply source 1010 through return duct 1038. It should be appreciated that although return duct 1038 is illustrated as returning collected additive powder 1006 back into powder supply source 1010, some or all of additive powder 1006 could alternatively be routed for disposal, reconditioning, or for some other use.

Powder reclamation system 1002 may further include a filter mechanism 1050 that is operably coupled to return duct 1038 for removing any contaminants entrained within flow of additive powder 1006. In this regard, for example, filter mechanism 1050 may be a simple filter screen, a sieve, a cyclonic separator, or any other suitable mechanism for filtering additive powder 1006. In addition, filter mechanism 1050 may include a drying mechanism for regulating the humidity of collected additive powder 1006, may be configured for breaking up clumps formed within additive powder 1006, or may be configured for conditioning the return flow of additive powder 1006 and any other suitable manner.

Suction inlet 1040 may be positioned at any location suitable for capturing and collecting misdirected additive powder during a refill process. In this regard, upper intake duct 1034 and lower intake duct 1036 may be fixed relative to conveyor 1014, may be fixed relative to hopper 1004, or may move as necessary to collect misdirected powders. According to the illustrated embodiment, suction inlet 1040 of upper intake duct 1034 is positioned above discharge 1016 of conveyor 1014. In this manner, upper intake duct 1034 is generally configured for drawing in the dust plume generated when additive powder is dropped off of conveyor 1014 and into hopper 1004. In addition, suction inlet 1040 of lower intake duct 1036 may be positioned below hopper 1004, e.g., to collect additive powder 1006 that misses or overflows out of hopper 1004 during the refill process.

According to an exemplary embodiment, suction inlet 1040 may generally include a vacuum shroud 1052 to facilitate improved capturing of misdirected additive powder 1006. For example as illustrated in FIG. 8, suction inlet 1040 may include vacuum shroud 1052 which is sized and oriented for capturing all powder falling under the force of gravity. More specifically, referring to vacuum shroud 1052 on lower intake duct 1036, vacuum shroud 1052 may define a shroud width 1054 that is larger than a hopper width 1056 of hopper 1004. According still other embodiments, vacuum shroud 1052 may have any suitable size, shape, and position drawing in additive powder 1006.

As illustrated in FIG. 8, duct system 1032 is operably coupled with a single vacuum pump 1030 which generates a vacuum for drawing in additive powder 1006. However, it should be appreciated that according to alternative embodiments, any suitable number of vacuum pumps may be used, each of which may be coupled to any suitable number of return ducts or filtering systems for optimally gathering, filtering, separating, or otherwise processing reclaimed additive powder 1006.

According to an exemplary embodiment the present subject matter, the hopper 1004 is coupled to a build unit which moves throughout a build area of the additive manufacturing machine. Thus, build unit may be configured for moving hopper 1004 to a refill station where powder supply system 1000 and powder reclamation system 1002 are located. According to such an embodiment, powder supply system 1000, powder reclamation system 1002, and powder supply source 1010 are all fixed within the additive manufacturing machine, e.g., relative to a gantry. However, it should be appreciated that according to alternative embodiments, these systems may be mobile such that some or all of them may move toward the build unit, e.g., into the build area, when hopper 1004 needs to be refilled. More specifically, according such embodiment, conveyor 1014, upper intake duct 1034, and lower intake duct 1036 may extend out to or otherwise move with hopper 1004 during a refill process. Other configurations are possible and within scope of the present subject matter.

Figure 9:
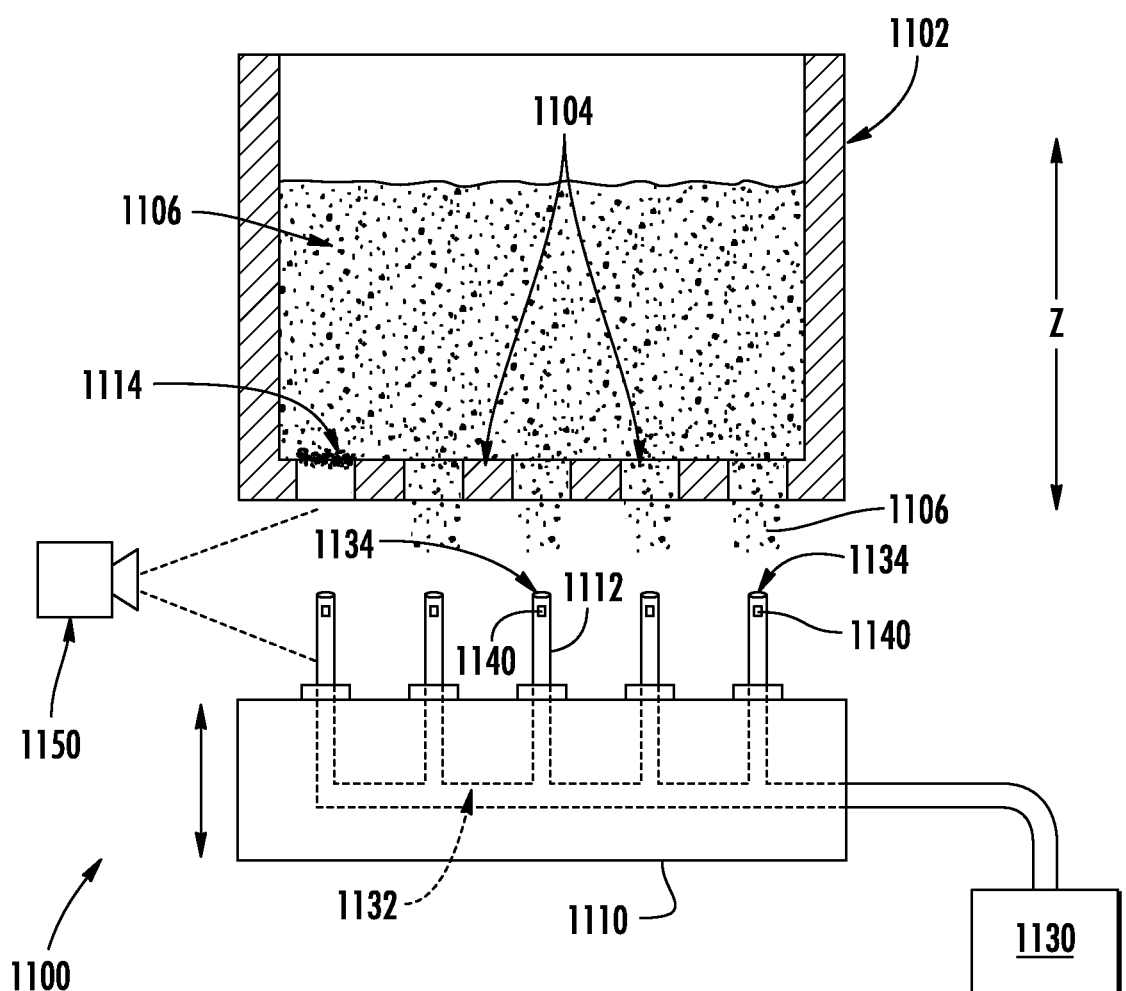
FIG. 9 illustrates a schematic view of a gate cleaning system according to an embodiment of the present invention.

Referring now to FIG. 9, a gate cleaning system 1100 for an additive manufacturing machine will be described according to an example embodiment. As illustrated, the additive manufacturing machine includes a powder dispenser 1102 that defines a plurality of gates 1104 for dispensing additive powder 1106. According to an exemplary embodiment, powder dispenser 1102 may further include gate plates (not shown in FIG. 9; similar to gate plate 410 from FIG. 2) that are associated with each of the plurality of gates 1104. As described above, powder dispenser 1102 may further include one or more actuators (not shown in FIG. 9; similar to actuator 412 from FIG. 2) configured for selectively opening and closing the gate plates to regulate the flow of additive powder 1106 through gates 1104.

As will be described in detail below, gate cleaning system 1100 is generally configured for ensuring the proper flow of additive powder 1106 through gates 1104 and onto a build platform or sub layer of additive powder 1106. In this regard, for example, gate cleaning system 1100 may be configured for cleaning gates 1104, dislodging clogged additive powder 1106, detecting one or more powder properties, or otherwise facilitating an improved powder dispensing process as will be describe below.

Referring to FIG. 9, gate cleaning system 1100 includes a cleaning head 1110 having a plurality probes 1112 that extend from cleaning head 1110 to selectively engage the plurality of gates 1104 to unclog additive powder 1106. In this regard, according to the exemplary illustrated embodiment, probes 1112 are prongs, bristles, or other protrusions extending along a vertical direction (e.g., the Z-direction) from a top of cleaning head 1110. Although the illustrated embodiment shows five gates 1104 and a single probe 1112 associated with each gate 1104, it should be appreciated that cleaning head 1110 may define, and each gate 1104 may associated with, any suitable number, size, and configuration of cleaning probes or instruments for cleaning that respective gate 1104.

During the gate cleaning operation, gate cleaning system 1100 is configured for moving cleaning head 1110 along the vertical direction V (or the Z-direction) toward powder dispenser 1102 for engaging the plurality of gates 1104. In this regard, for example, gate cleaning head 1110 may position probes 1112 physically within gates 1104 for contacting clogged powders (e.g., as identified by reference numeral 1114), thereby removing such clogs and permitting smooth in uniform flow of additive powder 1106 from gates 1104. The depth of penetration, the movement of probes 1112 within gates 1104, and other features associated with probes 1112 (some of which are described below according to exemplary embodiments) may be adjusted to ensure effective cleaning of gates 1104.

According to an illustrated embodiment, gate cleaning system 1100 may be located at a refill station and may perform a cleaning operation before, during, or after powder dispenser 1102 is refilled with additive powder 1106. For example, gate cleaning head 1110 can be positioned proximate powder supply system 1000 and powder reclamation system 1002 as described above. These systems may work together to clean powder dispenser 1102 and gates 1104, to refill powder dispenser 1102 with additive powder 1106 for subsequent powder application, and to reclaim powder lost during the refill process. Other configurations and embodiments are possible and within scope of the present subject matter.

According to the exemplary embodiment, gate cleaning head 1110 is configured for moving along the vertical direction upward to engage gates 1104 of a stationary powder dispenser 1102. However, it should be appreciated that according to alternative embodiments a cleaning head 1110 may move in any other suitable manner and in any other suitable angle or direction for engaging gates 1104 of powder dispenser 1102. Moreover, according to alternative embodiments, gate cleaning head 1110 may remain stationary while powder dispenser 1102 moves into engagement with probes 1112. Thus, any suitable movement of gate cleaning head 1110 and/or powder dispenser 1102 may be used to effectively clean gates 1104.

Referring still to FIG. 9, gate cleaning system 1100 may include additional features for cleaning gates 1104 or otherwise ensuring the quality of dispensed additive powder 1106. For example, each of the plurality of probes 1112 may be in fluid communication with a gas regulation device 1130. According to one embodiment, gas regulation device 1130 is a source of compressed gas. In this manner, gate cleaning head 1110 and probes 1112 may define internal passageways 1132 that are configured for routing and directing a flow of cleaning gas out of a discharge port 1134 positioned on a tip of each probe 1112. Thus, gas regulation device 1130 may urge the flow of gas through internal passageways 1132 and out of probes 1112 through discharge ports 1134. The flow of gas can be directed into or around gates 1104 to dislodge clogged powder, remove contaminants, or otherwise facilitate a cleaning process to gates 1104. According to such an embodiment, probes 1112 may fully enter through gates 1104 or may be positioned remote from gates 1104 and may simply direct a flow of gas into gates 1104.

According still another embodiment, gas regulation device 1130 may instead be a vacuum source for drawing in air, gases, and additive powder 1106 through probes 1112 and internal passageways 1132. According to such an embodiment, probes 1112 be positioned proximate to gates 1104 and may be configured for drawing out powder clogs and contaminants. The collected additive powder 1106 may be disposed of or may be reused. For example, according to one embodiment, the vacuum source is operably coupled with a powder reclamation system of an additive manufacturing machine, such as powder reclamation system 1002.

It should be appreciated that gas regulation device 1130 may be configured for providing a flow of compressed gas or providing suction to all probes 1112 simultaneously or to one or more probes 1112 independently as needed. For example, it may be desirable only to provide a flow of compressed gas to a gate 1104 that is clogged with additive powder 1106. Therefore internal passageways 1132 and/or each probe 1112 can include a valve or shut off (not shown) that is configured for stopping the flow of gas or air through that particular probe 1112. Other configurations of gate cleaning system 1100 and gas regulation device 1130 are possible and within the scope of the present subject matter.

Gate cleaning system 1100 may further include any suitable number and type of sensor 1140 for detecting a powder property of additive powder 1106. For example, sensors 1140 may be positioned on probes 1112 for direct contact with additive powder 1106 during a cleaning operation. In this manner, sensors 1140 may be configured for detecting powder properties or quality characteristics and using information regarding those characteristics to improve the performance of gate cleaning system 1100 and the operation of the additive manufacturing machine.

As used herein, "powder properties" may be used to refer to any characteristic of additive powder 1106 which may affect the flow of additive powder 1106 through gates 1104, the quality of additive powder 1106 deposited for subsequent fusion, or otherwise affect the additive manufacturing process. For example, powder properties may include a flow rate of additive powder 1106 from one or more gates 1104, the humidity of additive powder 1106, the presence or absence of additive powder 1106, the presence of clogs, or any other suitable characteristic of additive powder 1106.

According to an exemplary embodiment, gate cleaning system 1100 may further include a vision system 1150 that is configured for detecting and correcting the alignment of probes 1112 and gates 1104 during the gate cleaning process. In this regard, when gate cleaning head 1110 moves upward into engagement with powder dispenser 1102, it may be desirable to ensure probes 1112 are centered within each of their respective gates 1104. Thus, vision system 1150 may monitor the position of some or all of probes 1112 and gates 1104 to provide feedback to a controller (not shown) that regulates the movement of gate cleaning had 1110. Vision system 1150 may be, for example, a camera, a proximity sensing system, the laser distance measuring system, or any other suitable system for detecting the position of one or more objects within a three-dimensional space.

Although gate cleaning system 1100 as described above as an independent system for cleaning gates 1104 of powder dispenser 1102 of an additive manufacturing machine, it should be appreciated that gate cleaning system 1100 may be incorporated into a powder reclamation system, such as powder reclamation system 1002 described above. In this regard, for example, gas regulation device 1130 may be operably coupled with vacuum pump 1030 or duct system 1032 for collecting, filtering, and reusing collected additive powder 1106. For example, vacuum shroud 1052 of lower intake duct 1036 may be positioned below cleaning head 1110 for collecting additive powder 1106 that is dislodged from gates 1104 during a cleaning operation.

Figure 10:
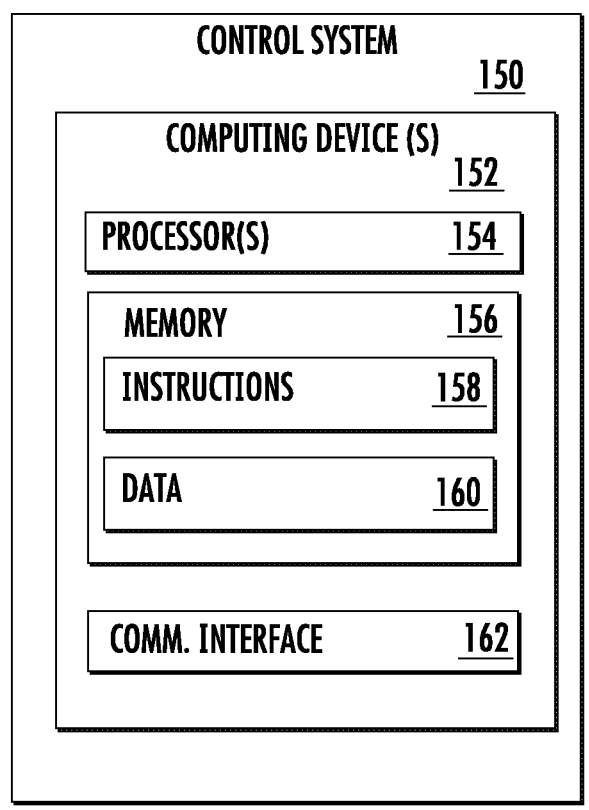
FIG. 10 shows an exemplary control system for use with an additive manufacturing machine and powder refill system according to an embodiment of the invention.

FIG. 10 depicts a block diagram of an example control system 150 that can be used to implement methods and systems according to example embodiments of the present disclosure, particularly the operation of powder supply system 1000, powder reclamation system 1002, gate cleaning system 1100, or any other systems of additive manufacturing machine. As shown, the control system 150 can include one or more computing device(s) 152. The one or more computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for controlling the operation of an additive manufacturing machine.

The memory device(s) 156 can further store data 160 that can be accessed by the one or more processor(s) 154. For example, the data 160 can include any data used for operating an additive manufacturing machine, as described herein. The data 160 can include one or more table(s), function(s), algorithm(s), model(s), equation(s), etc. for operating an additive manufacturing machine according to example embodiments of the present disclosure.

The one or more computing device(s) 152 can also include a communication interface 162 used to communicate, for example, with the other components of the system. The communication interface 162 can include any suitable components for interfacing with one or more network(s), including for example, transmitters, receivers, ports, controllers, antennas, or other suitable components.

The powder supply, reclamation, and gate cleaning systems described above provide several advantages compared to conventional powder supply systems. For example, by using powder supply and reclamation systems, a hopper may be refilled precisely and without wasting large amounts of additive powder. In this regard, misdirected additive powder may be collected and returned to the powder reservoir for reuse, thereby eliminating waste and reducing operational costs. In addition, powder reclamation system reduces or eliminates the build-up of additive powder throughout additive manufacturing machine, which may result in operational issues and degradation of finished component quality. The gate cleaning system ensures that additive powder is smoothly and uniformly deposited layer-by-layer onto a build platform or sublayer of additive powder to facilitate an improved additive manufacturing process. Other advantages to powder supply, reclamation, and gate cleaning systems will be apparent to those skilled in the art.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine defining a vertical direction (V), the additive manufacturing machine comprising:
    a build unit comprising a powder dispenser including a hopper for receiving a volume of additive powder;
    a powder supply system comprising a powder supply source for providing additive powder into the hopper during a refill process and a conveyor that transports additive powder dispensed from the powder supply source to the hopper; and
    a powder reclamation system comprising:
        a suction inlet;
        a vacuum pump for generating a suction; and
        a vacuum duct extending from the vacuum pump to the suction inlet, wherein the vacuum pump generates the suction at the suction inlet for drawing in misdirected additive powder dispensed during the refill process.

2. The additive manufacturing machine of claim 1, wherein a discharge of the conveyor is positioned over the hopper along the vertical direction (V).

3. The additive manufacturing machine of claim 2, wherein the suction inlet is positioned above the discharge of the conveyor to collect a dust plume generated when additive powder falls into the hopper.

4. The additive manufacturing machine of claim 2, wherein the suction inlet is positioned below the hopper to collect additive powder that falls past the hopper.

5. The additive manufacturing machine of claim 4, wherein the suction inlet comprises a vacuum shroud that defines a shroud width that is larger than a width of the hopper.

6. The additive manufacturing machine of claim 1, wherein the vacuum duct is a first vacuum duct and the powder reclamation system comprises a second vacuum duct, wherein each of the first and second vacuum ducts is operably coupled to the vacuum pump.

7. The additive manufacturing machine of claim 1, wherein the powder supply source is a powder reservoir and the powder reclamation system further comprises:
 a return duct that operably couples the vacuum pump to the powder reservoir for depositing collected additive powder into the powder reservoir; and
 a filter mechanism operably coupled to the return duct for filtering out contaminants from the collected additive powder.

8. An additive manufacturing machine defining a vertical direction (V), the additive manufacturing machine comprising:
 a build unit comprising a powder dispenser including a hopper for receiving a volume of additive powder;
 a powder supply system comprising a powder supply source for providing additive powder into the hopper during a refill process; and
 a powder reclamation system comprising:
  a suction inlet;
  a vacuum pump for generating a suction;
  a vacuum duct extending from the vacuum pump to the suction inlet, wherein the vacuum pump generates the suction at the suction inlet for drawing in misdirected additive powder dispensed during the refill process; and
 a gantry movably supporting the build unit within a build area, wherein the powder supply system and the powder reclamation system are fixed relative to the gantry, and wherein the gantry is configured for moving the build unit to a refill location proximate the powder supply system and the powder reclamation system to perform the refill process.

9. The additive manufacturing machine of claim 1, wherein the powder dispenser comprises a plurality of gates movable between an open position and a closed position for regulating the dispensation of additive powder from the hopper.

10. An additive manufacturing machine defining a vertical direction (V), the additive manufacturing machine comprising:
 a build unit comprising a powder dispenser including a hopper for receiving a volume of additive powder;
 a powder supply system comprising a powder supply source for providing additive powder into the hopper during a refill process; and
 a powder reclamation system comprising:
  a suction inlet;
  a vacuum pump for generating a suction;
  a vacuum duct extending from the vacuum pump to the suction inlet, wherein the vacuum pump generates the suction at the suction inlet for drawing in misdirected additive powder dispensed during the refill process; and
 a gate cleaning system, the gate cleaning system comprising:
  a cleaning head comprising a plurality of probes that extend from the cleaning head to selectively engage a plurality of gates comprised by the powder dispenser to unclog additive powder.

11. The additive manufacturing machine of claim 10, wherein each of the plurality of probes enter a gate of the plurality of gates to contact the additive powder.

12. The additive manufacturing machine of claim 10, wherein the plurality of probes are in fluid communication with a source of compressed gas, each of the plurality of probes configured for directing a flow of gas into the gates.

13. The additive manufacturing machine of claim 10, wherein at least one of the plurality of probes includes a sensor for detecting a powder property of the additive powder.

14. The additive manufacturing machine of claim 10, wherein the plurality of probes each define a vacuum head for vacuuming additive powder.

15. The additive manufacturing machine of claim 10, wherein the gate cleaning system includes a vision system for determining the position of the cleaning head and the plurality of probes relative to the gates.

16. The additive manufacturing machine of claim 1, wherein the vacuum duct extends directly from the vacuum pump to the suction inlet.

17. The additive manufacturing machine of claim 1, wherein the volume of additive powder received by the hopper is used to form an object to be additively manufactured by the additive manufacturing machine.

18. An additive manufacturing machine defining a vertical direction (V), the additive manufacturing machine comprising:
 a build unit comprising a powder dispenser including a hopper for receiving a volume of additive powder, the powder dispenser comprising a plurality of gates movable between an open position and a closed position for regulating the dispensation of additive powder from the hopper;
 a powder supply system comprising a powder supply source for providing additive powder into the hopper during a refill process; and
 a powder reclamation system comprising:
  a vacuum pump for generating a suction;
  a vacuum duct extending from the vacuum pump to a suction inlet, the suction inlet being positioned for collecting misdirected additive powder dispensed during the refill process; and
  a gate cleaning system that comprises a cleaning head, the cleaning head comprising a plurality of probes that extend from the cleaning head to selectively engage the plurality of gates to unclog additive powder.

19. The additive manufacturing machine of claim 18, wherein the vacuum duct extends directly from the vacuum pump to the suction inlet.

20. The additive manufacturing machine of claim 18, wherein the powder supply system further comprises a conveyor that transports additive powder dispensed from the powder supply source to the hopper, a discharge of the conveyor being positioned over the hopper along the vertical direction (V).

* * * * *